(12) United States Patent
Flake et al.

(10) Patent No.: US 8,682,736 B2
(45) Date of Patent: Mar. 25, 2014

(54) COLLECTION REPRESENTS COMBINED INTENT

(75) Inventors: Gary W. Flake, Bellevue, WA (US); Karim Farouki, Seattle, WA (US); Blaise Aguera y Arcas, Seattle, WA (US); Brett D. Brewer, Sammamish, WA (US); Steven Drucker, Bellevue, WA (US); Tomasz Kasperkiewicz, Redmond, WA (US); Stephen L. Lawler, Redmond, WA (US); Donald James Lindsay, Mountain View, CA (US); Adam P. Sheppard, Seattle, WA (US); Richard Stephen Szeliski, Bellevue, WA (US); Jeffrey Jon Weir, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 936 days.

(21) Appl. No.: 12/144,706

(22) Filed: Jun. 24, 2008

(65) Prior Publication Data

US 2009/0319357 A1 Dec. 24, 2009

(51) Int. Cl.
*G06Q 30/00* (2012.01)
(52) U.S. Cl.
USPC ....................................................... 705/26.1
(58) Field of Classification Search
None
See application file for complete search history.

(56) References Cited

U.S. PATENT DOCUMENTS

| | | | |
|---|---|---|---|
| 4,992,947 A | 2/1991 | Nimura et al. | |
| 5,115,398 A | 5/1992 | De Jong | |
| 5,124,915 A | 6/1992 | Krenzel | |
| 5,489,922 A | 2/1996 | Zloof | |
| 5,559,707 A | 9/1996 | DeLorme et al. | |
| 5,832,296 A | 11/1998 | Wang et al. | |
| 5,964,701 A | 10/1999 | Asada et al. | |
| 5,982,298 A | 11/1999 | Lappenbusch et al. | |
| 6,034,661 A | 3/2000 | Servan-Scheiber et al. | |
| 6,097,374 A | 8/2000 | Howard | |

(Continued)

FOREIGN PATENT DOCUMENTS

| | | |
|---|---|---|
| WO | WO2007089951(A1) | 8/2007 |
| WO | WO2007133047(A1) | 11/2007 |
| WO | WO2008036969(A2) | 3/2008 |

OTHER PUBLICATIONS

"Beyond Search—Semantic Computing and Internet Economics Awards", External Research & Programs: RFP Awards, May 27, 2007, 3 pages, http://research.microsoft.com/ur/us/fundingopps/RFPs/beyondSearchAwards.

(Continued)

*Primary Examiner* — Paul Danneman
(74) *Attorney, Agent, or Firm* — Holly Nguyen; Carole Boelitz; Micky Minhas

(57) ABSTRACT

The claimed subject matter provides a system and/or a method that facilitates communicating intent-related data to a user. A display engine can enable exploration of a portion of image data during a browsing session. An intent component can receive a portion of data related to the browsing session, wherein the portion of data is at least one of a collection of browsing history or a portion of data displayed during a browsing session. The intent component can further evaluate the portion of data to ascertain a combined intent of a user. A selective ad component can infer an incompleteness of the combined intent to trigger a pre-qualification for an offer related to at least one of an item or service that fulfills the incompleteness.

20 Claims, 10 Drawing Sheets

(56) References Cited

U.S. PATENT DOCUMENTS

| | | | |
|---|---|---|---|
| 6,199,014 B1 | 3/2001 | Walker et al. | |
| 6,244,873 B1 | 6/2001 | Hill et al. | |
| 6,282,362 B1 | 8/2001 | Murphy et al. | |
| 6,314,184 B1 | 11/2001 | Fernandez-Martinez | |
| 6,380,923 B1 | 4/2002 | Fukumoto et al. | |
| 6,710,774 B1 | 3/2004 | Kawasaki et al. | |
| 6,728,706 B2* | 4/2004 | Aggarwal et al. | 1/1 |
| 6,804,659 B1 | 10/2004 | Graham et al. | |
| 6,853,982 B2 | 2/2005 | Smith et al. | |
| 6,885,939 B2 | 4/2005 | Schmidt et al. | |
| 6,901,379 B1* | 5/2005 | Balter et al. | 705/27.2 |
| 6,907,345 B2 | 6/2005 | Shipley et al. | |
| 6,928,615 B1 | 8/2005 | Haitsuka et al. | |
| 6,938,218 B1* | 8/2005 | Rosen | 715/850 |
| 7,050,102 B1 | 5/2006 | Vincent | |
| 7,075,513 B2 | 7/2006 | Silfverberg et al. | |
| 7,133,054 B2 | 11/2006 | Aguera y Arcas | |
| 7,136,875 B2 | 11/2006 | Anderson et al. | |
| 7,145,454 B2 | 12/2006 | Linjama et al. | |
| 7,145,549 B1 | 12/2006 | Sun | |
| 7,188,153 B2 | 3/2007 | Lunt et al. | |
| 7,221,364 B2 | 5/2007 | Matsumoto et al. | |
| 7,263,393 B2 | 8/2007 | Smith et al. | |
| 7,269,590 B2 | 9/2007 | Hull et al. | |
| 7,286,708 B2 | 10/2007 | Aguera Y Arcas | |
| 7,289,814 B2 | 10/2007 | Amir et al. | |
| 7,337,127 B1 | 2/2008 | Smith et al. | |
| 7,375,629 B1 | 5/2008 | Moyer | |
| 7,519,700 B1 | 4/2009 | Sapsford et al. | |
| 7,602,301 B1 | 10/2009 | Stirling et al. | |
| 7,696,860 B2 | 4/2010 | Gilson et al. | |
| 8,154,625 B2* | 4/2012 | Bocking et al. | 348/240.2 |
| 2003/0023485 A1 | 1/2003 | Newsome | |
| 2003/0142065 A1 | 7/2003 | Pahlavan | |
| 2003/0187660 A1 | 10/2003 | Gong | |
| 2004/0032395 A1 | 2/2004 | Goldenberg et al. | |
| 2004/0073644 A1 | 4/2004 | Koch et al. | |
| 2004/0169674 A1 | 9/2004 | Linjama | |
| 2004/0198398 A1 | 10/2004 | Amir et al. | |
| 2004/0263473 A1 | 12/2004 | Cho et al. | |
| 2005/0113167 A1 | 5/2005 | Buchner et al. | |
| 2005/0134610 A1 | 6/2005 | Doyle et al. | |
| 2005/0285861 A1 | 12/2005 | Fraser | |
| 2006/0033716 A1 | 2/2006 | Rosenberg et al. | |
| 2006/0064411 A1* | 3/2006 | Gross et al. | 707/3 |
| 2006/0067573 A1 | 3/2006 | Parr et al. | |
| 2006/0112111 A1 | 5/2006 | Tseng et al. | |
| 2006/0164383 A1 | 7/2006 | Machin et al. | |
| 2006/0179453 A1 | 8/2006 | Kadie et al. | |
| 2006/0200434 A1 | 9/2006 | Flinn et al. | |
| 2006/0212353 A1 | 9/2006 | Roslov et al. | |
| 2006/0218153 A1 | 9/2006 | Voon et al. | |
| 2006/0224583 A1 | 10/2006 | Fikes et al. | |
| 2006/0230058 A1 | 10/2006 | Morris | |
| 2006/0238379 A1 | 10/2006 | Kimchi et al. | |
| 2006/0282327 A1 | 12/2006 | Neal et al. | |
| 2007/0026798 A1 | 2/2007 | Hoogstra | |
| 2007/0031064 A1 | 2/2007 | Zhao et al. | |
| 2007/0094066 A1* | 4/2007 | Kumar et al. | 705/10 |
| 2007/0129882 A1 | 6/2007 | Sano et al. | |
| 2007/0143281 A1 | 6/2007 | Smirin et al. | |
| 2007/0175321 A1 | 8/2007 | Baum et al. | |
| 2007/0180078 A1 | 8/2007 | Murphy et al. | |
| 2007/0225904 A1 | 9/2007 | Pantalone et al. | |
| 2007/0244750 A1 | 10/2007 | Grannan et al. | |
| 2007/0271232 A1 | 11/2007 | Mattox et al. | |
| 2007/0273558 A1 | 11/2007 | Smith et al. | |
| 2007/0288439 A1 | 12/2007 | Rappaport et al. | |
| 2008/0004989 A1 | 1/2008 | Yi | |
| 2008/0027842 A1 | 1/2008 | Suginaka | |
| 2008/0046218 A1 | 2/2008 | Dontcheva et al. | |
| 2008/0046313 A1 | 2/2008 | Chen | |
| 2008/0059571 A1 | 3/2008 | Khoo | |
| 2008/0082565 A1 | 4/2008 | Chang et al. | |
| 2008/0091692 A1 | 4/2008 | Keith et al. | |
| 2008/0214944 A1 | 9/2008 | Morris et al. | |
| 2008/0214949 A1 | 9/2008 | Stivoric et al. | |
| 2008/0238916 A1 | 10/2008 | Ghosh et al. | |
| 2008/0317292 A1 | 12/2008 | Baker et al. | |
| 2009/0157503 A1 | 6/2009 | Farouki et al. | |

OTHER PUBLICATIONS

Jeffery Heer, Ed H. Chi, "Mining the Structure of User Activity Using Cluster Stability," 10 pages, Palo Alto Research Center, Palo Alto, CA, USA, http://jheer.org/files/2002-Lumberjack-SIAM.pdf.

Bamshad Mobasher, et al., "Automatic Personalization Based on Web Usage Mining," 20 pages http://www.cs.aue.auc.dk/~legind/IR%20course%20Spring%202003/artikler/15e-mobasher99automatic.pdf.

Max Media, "Pop ups and Contextual advertising", May 27, 2008, 2 pages, http://www.maxmediaus.com/pop.html.

Bidoshi, Virtual Reality Visualization for Maps of the Future, PhD Dissertation, The Ohio State University, 2003, 202 pages.

Dwyer et al., "Trust and privacy concern within social networking sites: A comparison of Facebook and MySpace", Proceedings of the Thirteenth Americas Conference on Information Systems, Keystone, CO, Aug. 9-12, 2007, 12 pages.

Golbeck et al., "Trust Networks on the Semantic Web", Proceedings of Cooperative Intelligent Agents, 2003, Helsinki, 13 pages.

Hristova, "Ad-Me: A Context-Sensitive Advertising System", retrieved on Jul. 1, 2008 at <<http://www.prism.ucd.ie/publications/pub2001/HriAdme01ii.pdf>>, 10 pages.

Katz et al., "Social Network-based Trust in Prioritized Default Logic," Proceedings of the twenty-first National Conference on Artificial Intelligence, 2006, 6 pages.

Marckini, "Contextual Advertising, Part 1 of 2", retrieved on Jul. 1, 2008 at <<http://www.clickz.com/showPage.html?page=3087311>>, The ClickZ Network, Oct. 6, 2003, 1 page.

Quin Zhu, et al., Unified Representation of Three Dimensional City Models, ISPRS Workshop on Servie and Application of Spatial Data Infrastructure, XXXVI (4/W6), Oct. 14-16, Hangzhou, China, 6 pages.

Tele Atlas Delivers StreetMap Premium for ESRI's ArcGIS Applications, <<http://www.teleatlas.com/WhyTeleAtlas/Investors/IRPressRelease/TA005281>>, Apr. 28, 2008, 2 pages.

The Map Room: Product Details, <<http://astore.amazon.com/maproom-20/detail/B000VRYLU2>>, Apr. 28, 2008.

"The Trust Ontology", Retrieved from the internet Apr. 28, 2008 at http://trust.mindswap.org/trustOnt.shtml, 2 pages.

Volkswagen and Google development revolutionary navigation system, <<http://www.automotoportal.com/article/Volkswagen_and_Google_development_navigation_system>>, Apr. 28, 2008, 3 pages.

Zhang, M2S Maps: Supporting Real-World Navigation with Mobile VR, College of Information Sciences and Technology, The Pennsylvania State University, <<http://zhang.ist.psu.edu/pdf/m2s.pdf>>, last accessed Apr. 28, 2008, 12 pages.

Office Action for U.S. Appl. No. 12/062,302, mailed on Jan. 31, 2012, Gary W. Flake, "Device Interaction With Combination of Rings", 29 pgs.

Office Action for U.S. Appl. No. 12/142,906, mailed on Feb. 13, 2012, Gary W. Flake, "Network of Trust as Married to Multi-scale", 25 pgs.

Office action for U.S. Appl. No. 12/125,514, mailed on Jan. 22, 2013, Flake et al., "Multi-Scale Navigational Visualization", 19 pages.

Non-Final Office Action for U.S. Appl. No. 12/125,514, mailed on May 31, 2011, Gary W. Flake, "Multi-Scale Navigational Visualization".

Non-Final Office Action for U.S. Appl. No. 12/062,302, mailed on Jun. 9, 2011, Gary Flake, "Device Interaction With Combination of Rings".

Office action for U.S. Appl. No. 12/142,906, mailed on Aug. 2, 2012, Flake et al., "Network of Trust as Married to Multi-scale", 33 pages.

Office action for U.S. Appl. No. 12/062,302, mailed on Aug. 24, 2012, Flake et al., "Device Interaction With Combination of Rings", 29 pages.

(56) References Cited

OTHER PUBLICATIONS

Non-final Office Action for U.S. Appl. No. 12/062,106, mailed on Aug. 18, 2011, Karim Farouki, "Client-Side Composing/Weighting of Ads", 25 pages.

Final Office Action for US Patent Application mailed on Aug. 3, 2011, Gray Falke, "Network of Trust as Married to Multi-scale".

Pollefeys, et al., "From Images to 3D Models. How computers can automatically build realistic 3D models from 2D images acquired with a handheld camera.", Communications of the ACM, vol. 45, No. 7, Jul. 2002, pp. 51-55 (total of 6 pages with photo cover page.).

Snavely, et al., "Photo Tourism: Exploring Photo Collections in 3D", 2006 ACM, 0730-0301/06/0700-0835.

Chen, "QuickTime VR—An Image-Based Approach to Virtual Environment Navigation," ACM, 1995, 10 pages.

Hirose, "Image-Based Virtual World Generation," IEEE, Jan.-Mar. 1997, 7 pages.

Robert Mohl, "Cognitive Space in the Interactive Movie Map: An Investigation of Spatial Learning in Virtual Environments," Massachusetts Institute of Technology, Department of Architecture, Feb. 1982, 232 pages.

Office Action for U.S. Appl. No. 12/125,514, mailed on Oct. 26, 2011, Gary W. Flake, "Multi-Scale Navigational Visualization", 18 pgs.

Office Action for U.S. Appl. No. 12/062,302, mailed on Dec. 1, 2011, Gary W. Flake, "Device Interaction With Combination of Rings", 31 pgs.

Farringdon, et al., "Wearable Sensor Badge & Sensor Jacket for Context Awareness". <<http://citeseer.ist.psu.edu/cache/papers/cs/26981/http:zSzzSzwww-2.cs.cmu.eduzSzafszSzcs.cmu.eduzSzuserzSzsatyazSzWebzSzMCSALINKzSzPAPERSzSzfarringdon99.pdf/farringdon99wearable.pdf>> Last accessed Mar. 20, 2008, 7 pages.

Metzger, et al., "FreeDigiter: A Contact-free Device for Gesture Control". <<http://www.static.cc.getech.edu/~thad/p/031_30_Gesture/iswc04-freedigiter.pdf>> Last accessed Mar. 20, 2008, 4 pages.

Office action for U.S. Appl. No. 12/125,514, mailed on Jun. 5, 2013,Flake et al., "Multi-Scale Navigational Visualization", 21 pages.

Office action for U.S. Appl. No. 12/125,514, mailed on Sep. 24, 2013, Flake, et al., "Multi-Scale Navigational Visualization", 21 pages.

* cited by examiner

COLLECTION REPRESENTS COMBINED INTENT

CROSS REFERENCE TO RELATED APPLICATION(S)

This application relates to U.S. patent application Ser. No. 12/142,906 filed on Jun. 20, 2008, entitled "NETWORK OF TRUST AS MARRIED TO MULTI-SCALE (MS322076.01/MSFTP2121US)" and U.S. patent application Ser. No. 12/062,106 filed on Apr. 3, 2008, entitled "CLIENT-SIDE COMPOSING/WEIGHTING OF ADS (MS322067.01/MSFTP2113US)." The entireties of such applications are incorporated herein by reference.

BACKGROUND

Conventionally, web-based ad space, such as web pages or advertisement content included in a webpage are comprised of images or other visual components of a fixed spatial scale, generally based upon settings associated with an output display screen resolution and/or the amount of screen real estate allocated to a viewing application, e.g. the size of a browser that is displayed on the screen to the user.

In addition to finite screen real estate associated with hardware displays, advertisers are further limited by the circumstance that ads are often only secondary content for most any website or page. Accordingly, ad space is generally relegated to small blocks of screen real estate, typically located at the top or along side panels of a web page. While many advertisers have created clever ways to attract a user's attention even with limited amounts of screen real estate, there exists a rational limit to how much information can be supplied by a finite display space under conventional advertising means, whereas actual transactions—the primary goal of the advertiser—usually necessitate a much greater amount of information be provided to the user.

Accordingly, most forms of web-based advertising rely almost exclusively on a click-through advertising model or mechanism in which a fixed spatial scale image is employed to encourage a potential customer to click the ad, whereby the potential customer can then be routed via hyperlink to more extensive amounts of information pertaining to the ad. Furthermore, ads are typically pre-identified and placed in pre-determined locations on websites, web pages, web space, and the like based on potential traffic (e.g., placing a sport-related ad on a sports team web page, etc.). Yet, populating web-based ads in such a blind manner does not provide much confidence or acknowledgement that the correct audience or consumer is being targeted.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate presenting packaged offers, services, and/or goods to users based on activity within a browsing session. In general, packaging good and services together can yield unique discounts and opportunities for consumers. Evaluating content related to a browsing session allows advertisements to be contextual, yet the subject innovation can evaluate numerous collections of data (e.g., multi-scale images with multiple planes of view, 3D virtual environments constructed from 2D images, etc.) to ascertain a representative intent of a user. An intent component can evaluate a user's activity (e.g., browsing session, executing applications, browser history, etc.) in order to identify an intent of the user. Based on this intent, a selective ad component can present ads that compliment such intent (e.g., fulfill a need, complimentary items/goods/services, etc.) or present packaged offers involving items identified by evaluating the user's activity within the browsing session.

Moreover, the browsing session can be a conventional browser or any browser enhanced with display engine functionality for multi-scale images (e.g., seamless and cohesive panning, zooming, etc. with consistent resolution). For example, if a user is buying a shirt, pants, and shoes, the intent component can populate the browsing session with advertisements for socks, underwear, or a hat (e.g., an item that reflects a missing article of clothing from the clothing purchases). Following the example, the selective ad component can further locate packaged offers or deals involving two or more of such articles of clothing. Generally, a collection of browsing sessions can be evaluated in order to identify a combined intent. The collection of data (e.g., browsing history, current browsing session, data displayed on a user screen, executing applications, etc.) can be reflective of a combined intent of a user or a plurality of users, wherein the intent is incomplete and such incompleteness is a pre-qualification for an offer that satisfies that intent. In other aspects of the claimed subject matter, methods are provided that facilitate presenting packaged offers and/or complimentary items, goods, or services.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
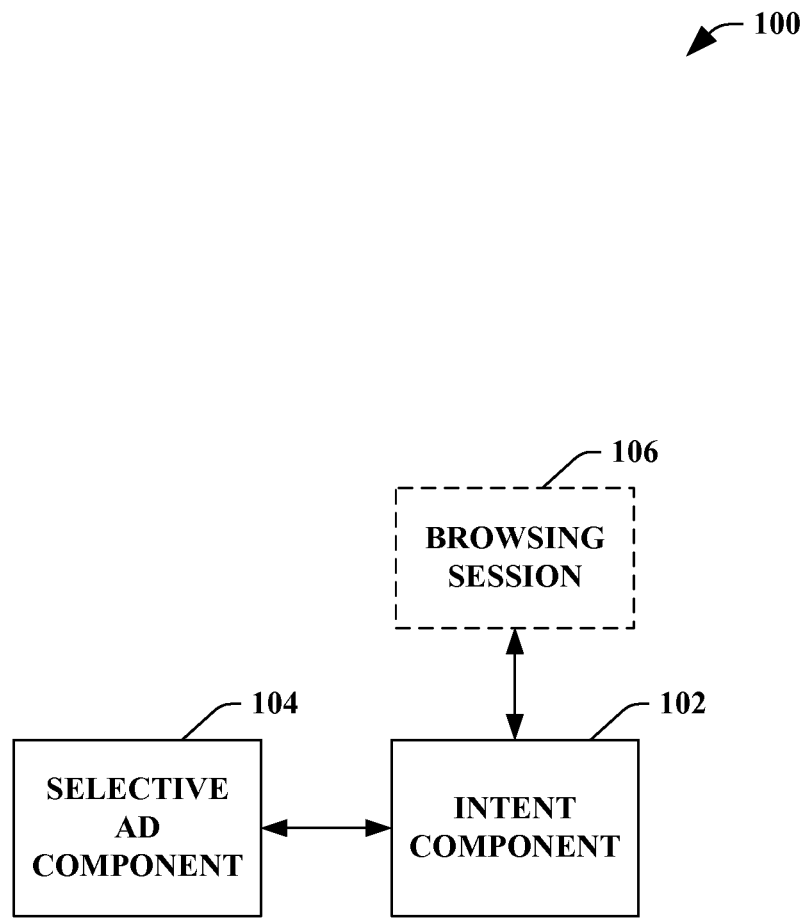
FIG. 1 illustrates a block diagram of an exemplary system that facilitates analyzing user activity to identify a representative intent in order to present offers related thereto.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "session," "selector," "aggregator," "engine," "privatizer," "solicitor," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates analyzing user activity to identify a representative intent in order to present offers related thereto. The system 100 can include an intent component 102 that can ascertain intent of a user and identify packaged offers that satisfy such intent. The intent component 102 can evaluate collections of data related to a browsing session 106 to determine intent, wherein a selective ad component 104 can provide packaged offers (e.g., sales, coupons, deals, specials, ads, products, etc.) including combination of items, goods, services, etc. that are intent-related. Moreover, a specific good or service can be provided based on the evaluation of the intent component 102 which can fulfill or satisfy the inferred intent. In general, the system 200 enables a packaged offer or item (e.g., good, service, etc.) to be identified to which a user would not typically find. In other words, the selective ad component 104 can infer an incompleteness of the combined intent to trigger a pre-qualification for an offer related to at least one of an item or service that fulfills such incompleteness.

For example, a user can browse data utilizing any suitable browsing component or application in which multiple browsing sessions can be concurrently employed. Thus, a first window can browse a first data set, a second window can include a second data set that is explored, a third window can include a third data set that is displayed, and so on and so forth. The intent related to the collection of browsing sessions (e.g., first window, second window, third window, etc.) can be evaluated to identify a packaged offer or an item correlating to the intent. For instance, the browsing data (e.g., first data set, second data set, third data set, etc.) can be examined to determine a corresponding intent. Based on such corresponding intent, an offer can be presented to the user, wherein the offer can be tied to a combination of items identified with the browsing session or intent. Moreover, an item can be identified and presented to the user based on the collective intent identified.

In a specific example, a user activity can be evaluated in order to identify the intent of buying a computer, a printer, and Internet service. Based on this inferred intent, a packaged offer or deal can be located to which provides a discount or sale for the combination of such goods (e.g., buy a computer with Internet service and get a free printer from a particular vendor or company). It is to be appreciated that the packaged deal need not be specific to a single user and the packaged deal can be from any suitable number of users (e.g., a first user intending to purchase the computer, a second user intending to purchase the printer, etc.). Thus, a matching of potential consumers can be provided in order to take advantage of a packaged offer. In another instance, the inferred intent can enable an additional item or good to be presented to the user to which he or she would be interested. Thus, an Ethernet cable (e.g., for the Internet service connection), a pair of speakers, a monitor, etc. can be presented to the user (e.g., based on such good/item fulfilling or supplementing the intent of the user activity). In other words, complimentary goods or items can be provided to the user.

In addition, the system 100 can include any suitable and/or necessary interface component (not shown), which provides various adapters, connectors, channels, communication paths, etc. to integrate the ad selector into virtually any operating and/or database system(s) and/or with one another. In addition, the interface component can provide various adapters, connectors, channels, communication paths, etc., that provide for interaction with the intent component 102, the selective ad component 104, the browsing session 106, and any other device and/or component associated with the system 100.

Figure 2:
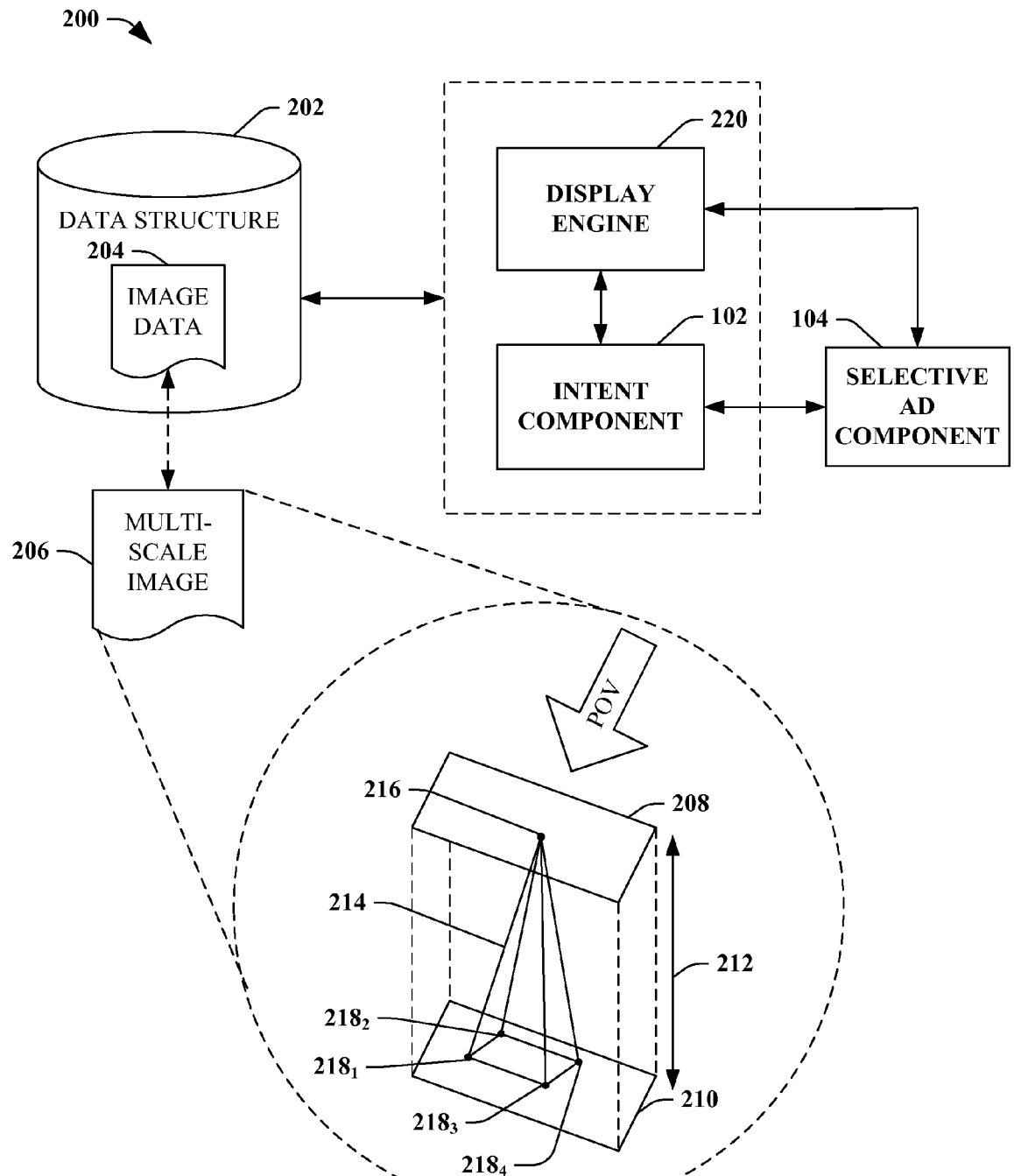
FIG. 2 illustrates a block diagram of an exemplary system that facilitates ascertaining intent from explored data including a portion of a multiscale image.

FIG. 2 illustrates a system 200 that facilitates ascertaining intent from explored data including a portion of a multiscale image. The intent component 102 can evaluate a plurality of data associated with the browsing session 106 in which such evaluation can define intent for a user. With the intent, the selective ad component 104 can provide at least one of a packaged deal (e.g., bulk discount, coupon, etc.) or a complimentary good/item. In particular, the browsing session 106 can include any suitable user activity associated with a computing device, machine, smartphone, mobile device, a portable digital assistant (PDA), a laptop, a gaming device, a media device, and the like. The user activity can be data navigation, data exploration, viewing data, interacting with data, etc. For instance, the browsing session 106 can be evaluated to identify applications utilized by the user and data related therewith. Thus, an email application can be evaluated and respective emails in order to ascertain intent of a user.

Generally, system 200 can include a data structure 202 with image data 204 that can represent, define, and/or characterize computer displayable multiscale image 206, wherein a display engine 220 can access and/or interact with at least one of the data structure 202 or the image data 204 (e.g., the image data 204 can be any suitable data that is viewable, displayable, and/or browse able). In particular, image data 204 can include two or more substantially parallel planes of view (e.g., layers, scales, etc.) that can be alternatively displayable, as encoded in image data 204 of data structure 202. For example, image 206 can include first plane 208 and second plane 210, as well as virtually any number of additional planes of view, any of which can be displayable and/or viewed based upon a level of zoom 212. For instance, planes 208, 210 can each include content, such as on the upper surfaces that can be viewable in an orthographic fashion. At a higher level of zoom 212, first plane 208 can be viewable, while at a lower level zoom 212 at least a portion of second plane 210 can replace on an output device what was previously viewable.

Moreover, planes 208, 210, et al., can be related by pyramidal volume 214 such that, e.g., any given pixel in first plane 208 can be related to four particular pixels in second plane 210. It should be appreciated that the indicated drawing is merely exemplary, as first plane 208 need not necessarily be the top-most plane (e.g., that which is viewable at the highest level of zoom 212), and, likewise, second plane 210 need not necessarily be the bottom-most plane (e.g., that which is viewable at the lowest level of zoom 212). Moreover, it is further not strictly necessary that first plane 208 and second plane 210 be direct neighbors, as other planes of view (e.g., at interim levels of zoom 212) can exist in between, yet even in such cases the relationship defined by pyramidal volume 214 can still exist. For example, each pixel in one plane of view can be related to four pixels in the subsequent next lower plane of view, and to 216 pixels in the next subsequent plane of view, and so on. Accordingly, the number of pixels included in pyramidal volume at a given level of zoom, l, can be described as $p=4^l$, where l is an integer index of the planes of view and where l is greater than or equal to zero. It should be appreciated that p can be, in some cases, greater than a number of pixels allocated to image 206 (or a layer thereof) by a display device (not shown) such as when the display device allocates a relatively small number of pixels to image 206 with other content subsuming the remainder or when the limits of physical pixels available for the display device or a viewable area is reached. In these or other cases, p can be truncated or pixels described by p can become viewable by way of panning image 206 at a current level of zoom 212.

However, in order to provide a concrete illustration, first plane 208 can be thought of as a top-most plane of view (e.g., l=0) and second plane 210 can be thought of as the next sequential level of zoom 212 (e.g., l=1), while appreciating that other planes of view can exist below second plane 210, all of which can be related by pyramidal volume 214. Thus, a given pixel in first plane 208, say, pixel 216, can by way of a pyramidal projection be related to pixels $218_1$-$218_4$ in second plane 210. The relationship between pixels included in pyramidal volume 214 can be such that content associated with pixels $218_1$-$218_4$ can be dependent upon content associated with pixel 216 and/or vice versa. It should be appreciated that each pixel in first plane 208 can be associated with four unique pixels in second plane 210 such that an independent and unique pyramidal volume can exist for each pixel in first plane 208. All or portions of planes 208, 210 can be displayed by, e.g. a physical display device with a static number of physical pixels, e.g., the number of pixels a physical display device provides for the region of the display that displays image 206 and/or planes 208, 210. Thus, physical pixels allocated to one or more planes of view may not change with changing levels of zoom 212; however, in a logical or structural sense (e.g., data included in image data 204) each success lower level of zoom 212 can include a plane of view with four times as many pixels as the previous plane of view.

The intent component 102 can further examine and/or analyze the image data 204 and/or the various planes of view navigated associated with the multiscale image 206. Based on such analysis and/or examination, the intent component 102 and/or the selective ad component 104 can communicate a packaged offer involving a combination of items/goods related to the intent or a complimentary item/good related to the intent. For example, a browsing session can include the image data 204 having multiscale image 206 to enable various planes of view and/or levels of data to be explored. Based on such exploration within the pyramidal volumes of data, intent of such browsing session can be generated to allow a packaged deal or a complimentary item to be determined. Moreover, it is to be appreciated that the browsing session can be associated with any suitable image data 204 (having multiscale image with pyramidal volumes of data at various view levels or planes of view) in at least one of a 2-dimensional (2D) environment or a 3-dimensional (3D) environment. In other words, it is to be appreciated that the intent component 102 and/or the selective ad component 104 can be utilized with image data having pyramidal volumes of data as well as single-plane data as conventionally browsed on the Internet, a network, a wireless network, and the like.

Figure 3:
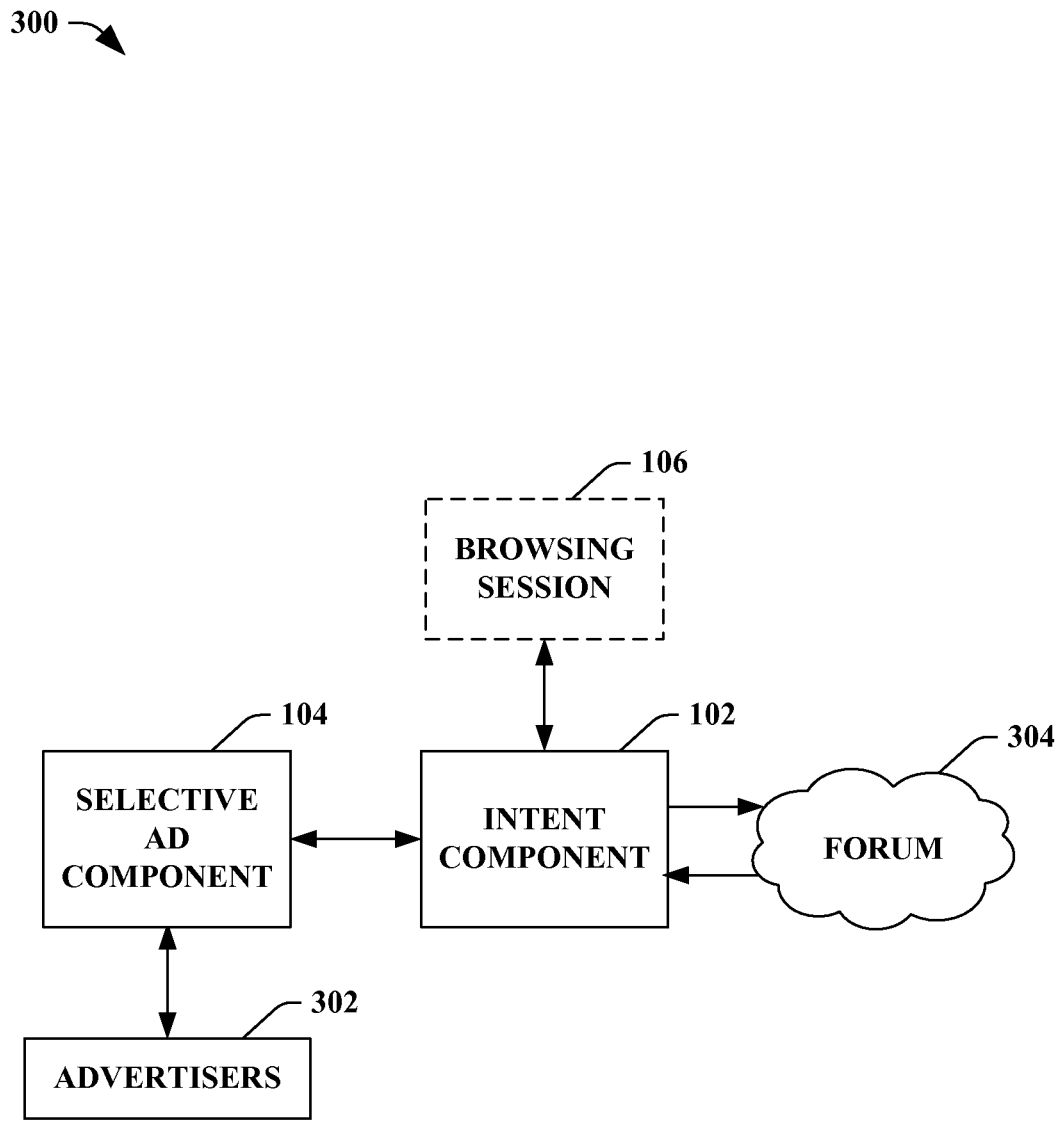
FIG. 3 illustrates a block diagram of an exemplary system that facilitates aggregating a plurality of users with substantially similar interests into a forum for data exchange.

FIG. 3 illustrates a system 300 that facilitates aggregating a plurality of users with substantially similar interests into a forum for data exchange. The system 300 can include the intent component 102 that can evaluate collections of data related to user activity within the browsing session 106 in which the selective ad component 104 can determine a packaged offer or a complimentary item accordingly. Specifically, the selective ad component 104 can locate offers for a combination of goods, items, or services that relate to a user's intent. Moreover, the selective ad component 104 can locate and present a complimentary good, service, or item that relates to a user's intent and supplements such desires, objectives, and/or purposes of the browsing session 106.

As mentioned, the intent component 102 can evaluate a collection of data in order to ascertain intent. Such collections of data can be aggregated and grouped for correlation to identified intents. For instance, a cluster of data from a portion of user activity within the browsing session can correlate to intent to purchase a magazine. This collection of data and "tagged" intent can be shared with a plurality of users. Moreover, such collections can be leveraged in order to identify intents. Thus, a collection of data related to a first user indicating a first intent can be leveraged to determine if a second user's intent is similar. In other words, a user's activity can be compared or analyzed in connection with a shared collection of data tagged with intent in order to ascertain if such user has a similar intent. Furthermore, the shared collections and identified intents can be weighted in order to place more or less emphasis in ascertaining or determining intent. For example, a close friend or relative have a higher weight or importance for a data collection representative of intent in comparison to a distant friend or stranger.

The intent component 102 and/or the selective ad component 104 can evaluate any suitable data associated with the browsing session 106. For example, the intent component 102 can evaluate one or more executing applications associated with the browsing session 106. An email application and respective email data, for instance, can be evaluated in order to identify intent of the user. Moreover, application data can be evaluated in order to identify relevant offers (e.g., packaged deals, bulk discounts, etc.) or complimentary items/goods for such browsing session. The application data can be, but is not limited to, data utilized by the application, metadata related to the application, version data, type of application, frequency of use, copyright data, manufacturer, size of the application, data utilized by the application, etc.

In another example, the intent component 102 can analyze behavior within the browsing session such as, but not limited to, click frequency, scroll frequency, highlighting, inputs, input device location (e.g., mouse cursor, etc.), etc. In still another example, the intent component 102 and/or the selective ad component 104 can examine usage of the browsing session 106. For instance, the system 300 can evaluate information such as, but not limited to, duration of browsing on a particular portion of data, explicit tagging (e.g., adding to favorites, bookmarks, etc.), frequency of visit/browsing, data feed subscription (e.g., RSS feeds, etc.), subscriptions, newsletters, implicit user data (e.g., passive monitoring of browsing activity, etc.), explicit user data (e.g., search strings, contextual data, etc.), profile data, user settings, user preferences, user specific settings for a web page (e.g., personalized web sites, etc.), etc. In addition, the browsing history related to a particular user can be analyzed in order to provide context for ad selection.

The system 300 can further include advertisers 302. The advertisers 302 can manage the available advertisements, offers, bulk discounts, coupons, specials, complimentary items, complimentary goods, and complimentary services. In particular, the advertisers 302 can manage such information with operations such as adding, deleting, uploading, storing, editing, etc. It is to be appreciated that the advertisers 302 can be any suitable entity that advertises with computer displaying data and there can be any suitable number of advertisers 302. Moreover, the advertisers 302 can approve and/or monitor the type of information that is automatically presented to the browsing sessions 106. In one particular example, the advertisers 302 can specifically tailor offers or packaged deals in connection with the user's intent related to items, goods, services, etc. Thus, intent may correspond to the purchase of a first item, a second item, and a third item, wherein the advertiser can provide a coupon, special, or sale on such combination of items. It is to be appreciated that the packaged deal need not be specific to a single user and the combination of goods can be from any suitable number of users. In the same example, a first user can intent to purchase the first item and a second user can intent to purchase the second and third items. In that case, the advertiser can provide a packaged offer for the purchase of the first item, the second item, and the third item to both the first user and the second user.

The system 300 can further include a forum 304 that can be an environment for communications between various entities (e.g., users, groups, businesses, enterprises, computers, devices, machines, etc.). Specifically, the forum 304 can enable users with common intents to converse. For example, users with common identified intentions can communicate within the forum 304 in light of such similarities. For instance, a first user and a second user can share intentions to vacation during a particular week in a year. Based on this similar intention, the users can communication and share information related to research, findings, prices, deals, offers, things to do, and the like within the forum 304. In general, the forum 304 can enable information sharing between individuals with similar intentions, interests, etc.

Figure 4:
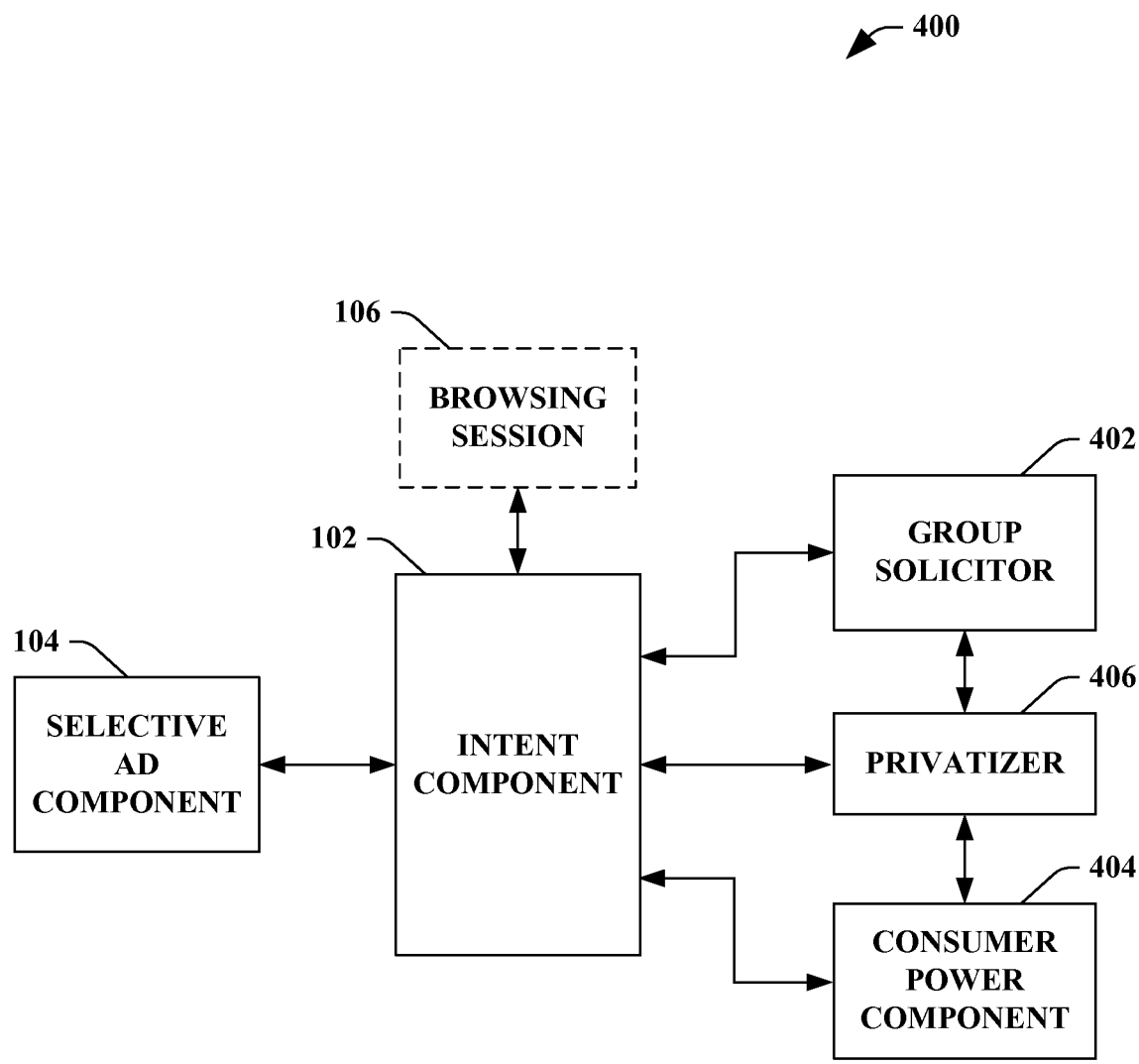
FIG. 4 illustrates a block diagram of an exemplary system that facilitates leveraging groups of users in accordance with the claimed subject matter.

FIG. 4 illustrates a system 400 that facilitates leveraging groups of users in accordance with the claimed subject matter. Generally, a collection of browsing sessions can be evaluated by the intent component 102 in order to identify a combined intent. The collection of data (e.g., browsing history, current browsing session, data displayed on a user screen, executing applications, shared collections from various users indicative of intent, etc.) can be reflective of a combined intent of a user or a plurality of users, wherein the intent is incomplete and such incompleteness is a pre-qualification for an offer that satisfies that intent. The selective ad component 104 can identify a complimentary good, item, or service that satisfies such incompleteness.

For example, if a user is buying a shirt, pants, and shoes, the intent component can populate the browsing session with advertisements for socks, underwear, or a hat (e.g., an item that reflects a missing article of clothing from the clothing purchases). Following the example, the selective ad component 104 can further locate packaged offers or deals involving two or more of such articles of clothing. Moreover, the selective ad component 104 can identify a complimentary item, good, or service in connection with a user's intent, wherein such complimentary item, good, or service satisfies an incompleteness of the user's intent.

The system 400 can further include a group solicitor 402 that enables user subscription to receive particular offers, ads, discounts, sales, and the like in regards to goods, items, or services. For example, the group solicitor 402 can allow a user to subscribe to a receive solicitations from manufacturers, producers, or service provider based on his or her liking. For example, a questionnaire or survey can be utilized by a user to identify goods or services to which they are interested in receiving information (e.g., ads, discounts, sales, offers, etc.). In other words, the group solicitor 402 can allow a user to define and select solicitations (e.g., group ads, bulk offers, specials, combination offers, etc.) to receive or the solicitations can be offered based on evaluation of the browsing sessions 106. It is to be appreciated that the user can opt-in to such group solicitor 402 in order to receive package discounts or sales. Upon acceptance, such opt-in opportunities can be based on the evaluation of the browsing sessions 106. For example, based on evaluating the browsing session 106, a user can be offered to subscribe to a "Brand A" solicitation since intent of such browsing sessions corresponds to "Brand A." With this subscription, the user can receive offers, ads, discounts, sales, complimentary goods, complimentary items, complimentary services, and the like to goods and/or services related to "Brand A."

The system 400 can further include a consumer power component 404 that enables a collection of consumers or users interested in a common good or service to be aggregated in order to provide an increase in buying power, wherein such buying power can justify a discount or price reduction. For instance, the consumer power component 404 can provide a targeted co-op ad discount that offers an opportunity or discount for members of a select group. In another example, the consumer power component 404 can encourage membership or users with a revenue sharing technique. Thus, an amount of revenue saved or received in connection with the buying power from the consumer power component 404 group can be distributed to the members (e.g., equally, based on a percentage of purchases, etc.).

The system 400 can further include a privatizer 406 that can protect private data or information related to a user in connection with group subscriptions or opt-ins for the group solicitor 402 and/or the consumer power component 404. For example, the anonymity of a user can be protected and ensured when joining or utilizing such groups. Thus, private information or data can be secure, wherein such private information or data can be, but is not limited to, credit card information, account information, user name, passwords, personal information (e.g., address, name, date of birth, phone number, social security number, income, email address, zip code, work affiliations, etc.), age, height, weight, personal tasks, identity, etc. In general, the privatizer 406 can protect any suitable data or information to which a user identifies as private or not to be public.

Figure 5:
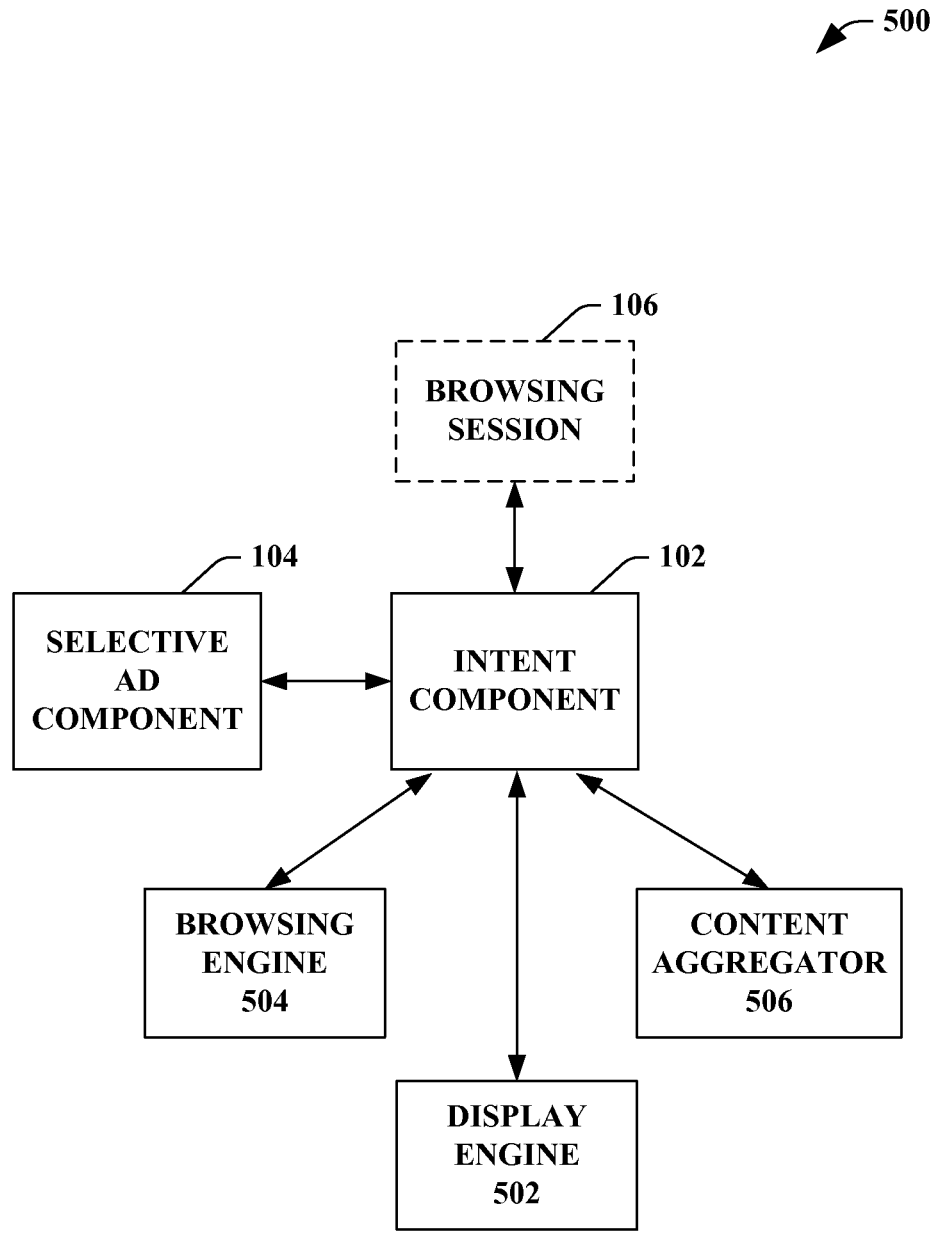
FIG. 5 illustrates a block diagram of exemplary system that facilitates enhancing implementation of offer solicitation and/or packaged offers described herein with a display technique, a browse technique, and/or a virtual environment technique.

FIG. 5 illustrates a block diagram of a system 500 that facilitates enhancing implementation of offer solicitation and/or packaged offers described herein with a display technique, a browse technique, and/or a virtual environment technique. The system 500 can include the intent component 102, the selective ad component 104, and/or the browsing session 106 as described above. The system 500 can further include a display engine 502 that enables seamless pan and/or zoom interaction with any suitable displayed data, wherein such data can include multiple scales or views and one or more resolutions associated therewith. In other words, the display engine 502 can manipulate an initial default view for displayed data by enabling zooming (e.g., zoom in, zoom out, etc.) and/or panning (e.g., pan up, pan down, pan right, pan left, etc.) in which such zoomed or panned views can include various resolution qualities. The display engine 502 enables visual information to be smoothly browsed regardless of the amount of data involved or bandwidth of a network. Moreover, the display engine 502 can be employed with any suitable display or screen (e.g., portable device, cellular device, monitor, plasma television, etc.). The display engine 502 can further provide at least one of the following benefits or enhancements: 1) speed of navigation can be independent of size or number of objects (e.g., data); 2) performance can depend on a ratio of bandwidth to pixels on a screen or display; 3) transitions between views can be smooth; and 4) scaling is near perfect and rapid for screens of any resolution.

For example, an image can be viewed at a default view with a specific resolution. Yet, the display engine 502 can allow the image to be zoomed and/or panned at multiple views or scales (in comparison to the default view) with various resolutions. Thus, a user can zoom in on a portion of the image to get a magnified view at an equal or higher resolution. By enabling the image to be zoomed and/or panned, the image can include virtually limitless space or volume that can be viewed or explored at various scales, levels, or views with each including one or more resolutions. In other words, an image can be viewed at a more granular level while maintaining resolution with smooth transitions independent of pan, zoom, etc. Moreover, a first view may not expose portions of information or data on the image until zoomed or panned upon with the display engine 502.

A browsing engine 504 can also be included with the system 500. The browsing engine 504 can leverage the display engine 502 to implement seamless and smooth panning and/or zooming for any suitable data browsed in connection with at least one of the Internet, a network, a server, a website, a web page, and the like. It is to be appreciated that the browsing engine 504 can be a stand-alone component, incorporated into a browser, utilized with in combination with a browser (e.g., legacy browser via patch or firmware update, software, hardware, etc.), and/or any suitable combination thereof. For example, the browsing engine 504 can be incorporate Internet browsing capabilities such as seamless panning and/or zooming to an existing browser. For example, the browsing engine 504 can leverage the display engine 502 in order to provide enhanced browsing with seamless zoom and/or pan on a website, wherein various scales or views can be exposed by smooth zooming and/or panning.

The system 500 can further include a content aggregator 506 that can collect a plurality of two dimensional (2D) content (e.g., media data, images, video, photographs, metadata, trade cards, etc.) to create a three dimensional (3D) virtual environment that can be explored (e.g., displaying each image and perspective point). In order to provide a complete 3D environment to a user within the virtual environment, authentic views (e.g., pure views from images) are combined with synthetic views (e.g., interpolations between content such as a blend projected onto the 3D model). For instance, the content aggregator 506 can aggregate a large collection of photos of a place or an object, analyze such photos for similarities, and display such photos in a reconstructed 3D space, depicting how each photo relates to the next. It is to be appreciated that the collected content can be from various locations (e.g., the Internet, local data, remote data, server, network, wirelessly collected data, etc.). For instance, large collections of content (e.g., gigabytes, etc.) can be accessed quickly (e.g., seconds, etc.) in order to view a scene from virtually any angle or perspective. In another example, the content aggregator 506 can identify substantially similar content and zoom in to enlarge and focus on a small detail. The content aggregator 506 can provide at least one of the following: 1) walk or fly through a scene to see content from various angles; 2) seamlessly zoom in or out of content independent of resolution (e.g., megapixels, gigapixels, etc.); 3) locate where content was captured in relation to other content; 4) locate similar content to currently viewed content; and 5) communicate a collection or a particular view of content to an entity (e.g., user, machine, device, component, etc.).

It is to be appreciated that any suitable data displayed, utilized, or interacted utilizing at least one of the display engine 502, the browsing engine 504, and/or the content aggregator 506 can be examined, analyzed, evaluated, and the like in order to identify intent to which packaged offers and/or complimentary items can be located and/or communicated. For example, the data or view levels seamlessly navigated utilizing the display engine 502 can be evaluated in order to generalize an intent that can be used to identify packaged offers involving interested items or offers for missing items (e.g., complimentary items, goods, or services). In another example, the browsing engine 504 can be leveraged in which explored data can be evaluated in order to identify packaged offers (e.g., combination of items, goods, or services to obtain a discount) and/or complimentary items (e.g., satisfying incompleteness associated with a combined intent of a user). In still another example, data exploration (e.g., viewed data, perspective of such viewed data, etc.) within a 3D environment created from 2D content can be evaluated in order to communicate packaged offers and/or complimentary goods/services/items to a user browsing such environment.

Figure 6:
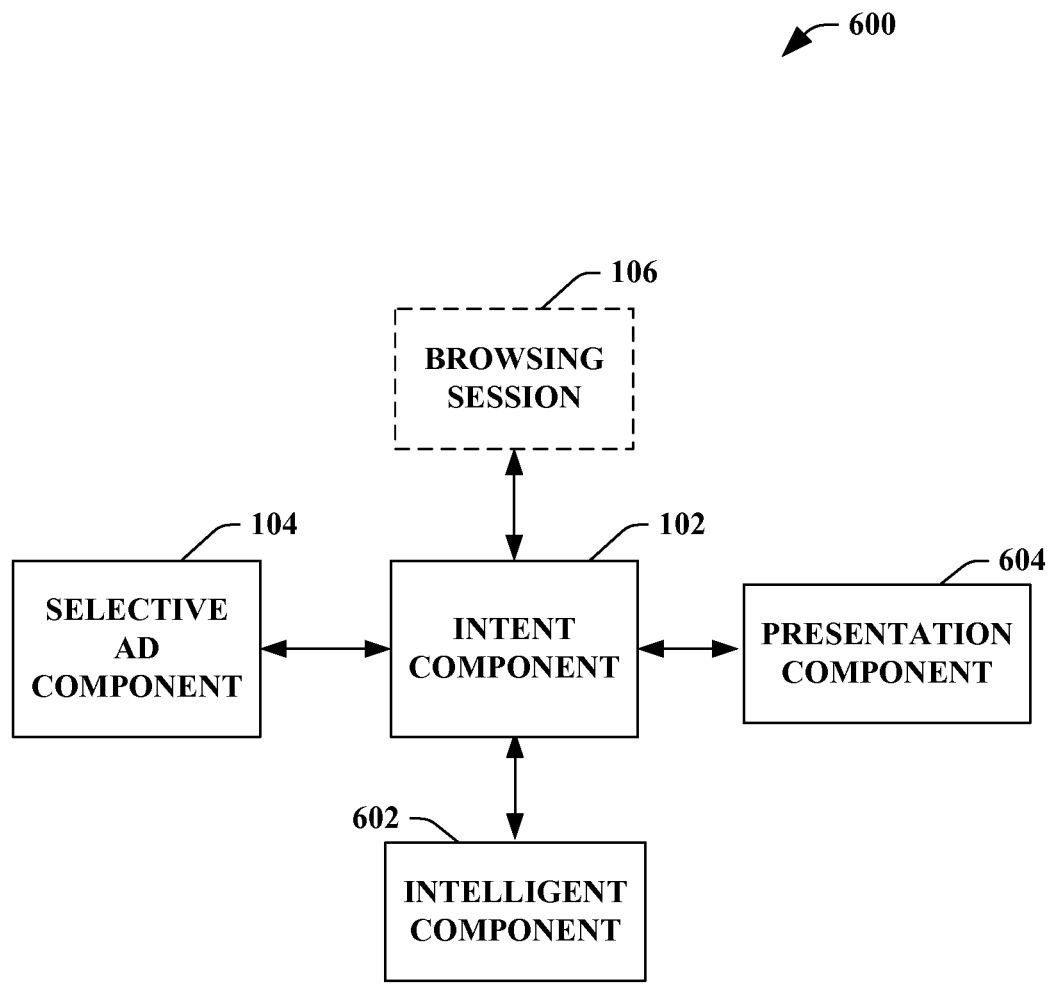
FIG. 6 illustrates a block diagram of an exemplary system that facilitates presenting packaged offers in accordance with an intent, wherein the packaged offer fulfills the intent based upon user activity.

FIG. 6 illustrates a system 600 that employs intelligence to facilitate presenting packaged offers in accordance with an intent, wherein the packaged offer fulfills the intent based upon user activity. The system 600 can include the intent component 102, the selective ad component 104, and the browsing sessions 106 which can be substantially similar to respective components and sessions described in previous figures. The system 600 further includes an intelligent component 602. The intelligent component 602 can be utilized by the intent component 102 and/or the selective ad component 104 to facilitate automatically identifying a packaged offer or a complimentary good, item, or service to push to a user during a browsing session based upon ascertaining intent of the browsing session 106. For example, the intelligent component 602 can infer user intent, packaged offers, complimentary goods, complimentary items, complimentary services, an incompleteness of user's intention, intent corresponding to a collection of data, user preference for a good, user preference for an item, user preference for a service, implicit intentions related to a user, explicit intentions related to a user, privatization preferences, group opt-in preferences, consumer power settings, etc.

The intelligent component 602 can employ value of information (VOI) computation in order to identify intent, packaged offers related to intent, and/or complimentary items/goods/services related to intent. For instance, by utilizing VOI computation, the most ideal and/or appropriate packaged offers and/or complimentary goods/services/items for a particular user can be determined. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The intent component 102 can further utilize a presentation component 604 that provides various types of user interfaces to facilitate interaction between a user and any component coupled to the intent component 102. As depicted, the presentation component 604 is a separate entity that can be utilized with the intent component 102. However, it is to be appreciated that the presentation component 604 and/or similar view components can be incorporated into the intent component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the intent component 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
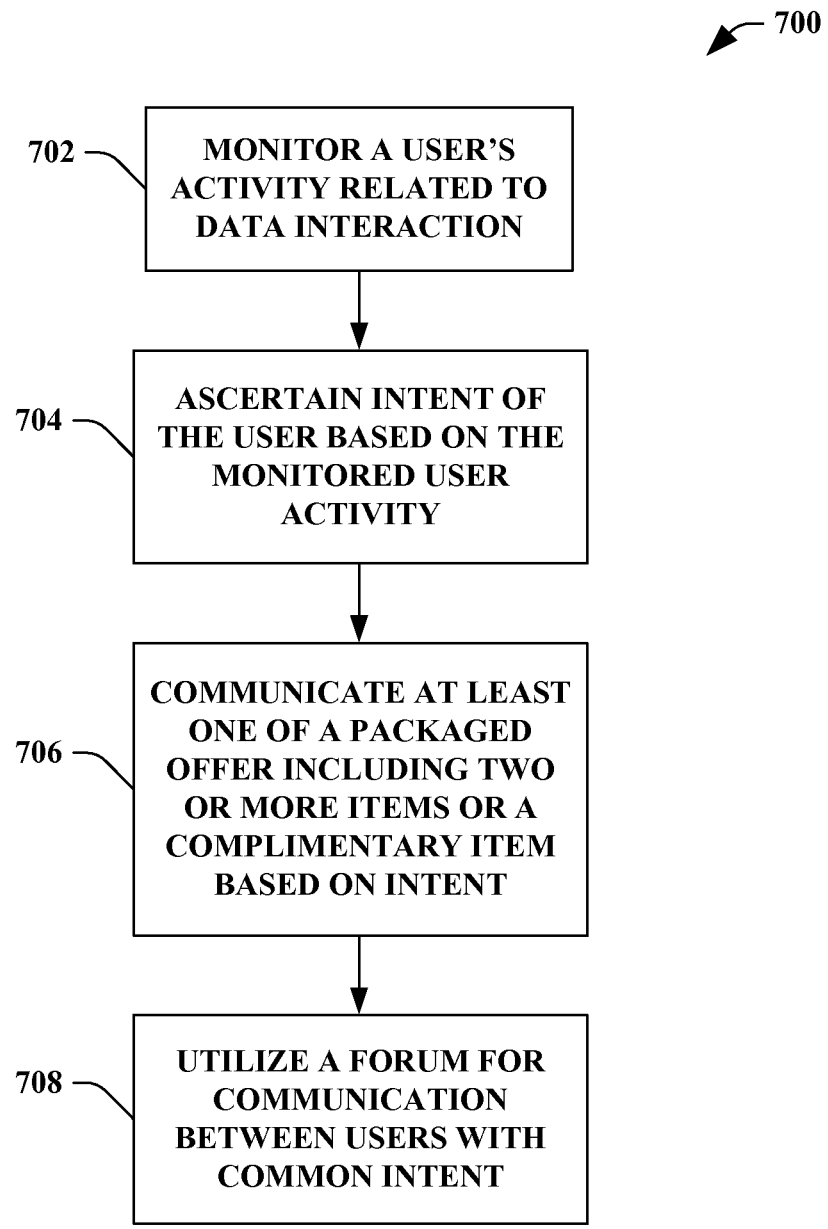
FIG. 7 illustrates an exemplary methodology for analyzing user activity to identify a representative intent in order to present offers related thereto.
Figure 8:
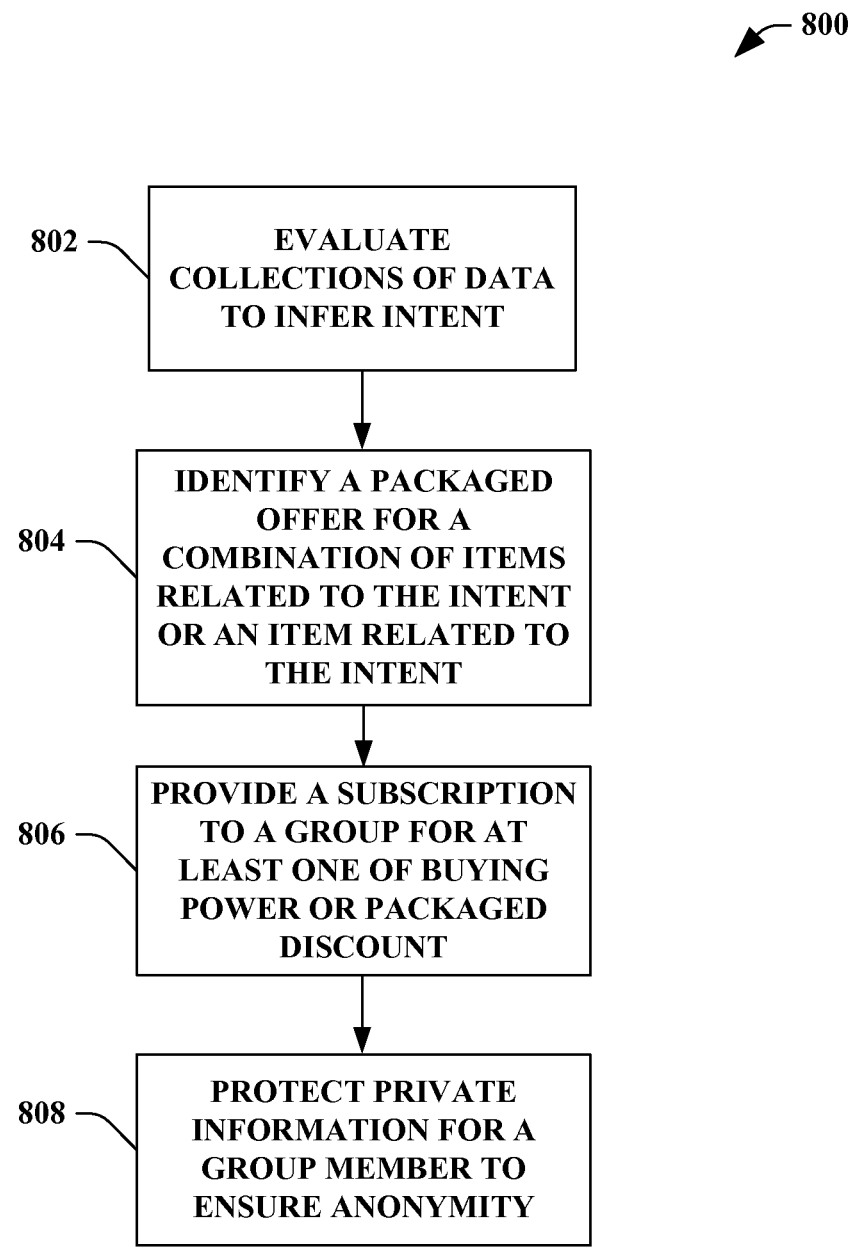
FIG. 8 illustrates an exemplary methodology that facilitates aggregating a plurality of users with substantially similar interests into a forum for data exchange.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates analyzing user activity to identify a representative intent in order to present offers related thereto. At reference numeral 702, a user's activity related to data interaction can be monitored. Specifically, the user's activity related to data interaction can involve a data browsing session, viewing data, browsing data, interacting with data with a display engine that enables seamless zoom and/or pan with multiscale image data, interacting with data with a browsing engine, interacting with data with a content aggregator, etc. Moreover, the monitoring of the user's activity can include examining executing applications, metadata related to applications, application data, etc. In general, a user's activity associated with a computing device, computer, laptop, smartphone, electronic device, a component, etc. can be monitored.

At reference numeral 704, intent of the user can be ascertained based on the monitored user activity. In other words, the data collected via monitoring can be evaluated in order to ascertain intent of the user. The intent can be indicative of the user's objective or purpose for exploring, interacting, viewing, etc. data. For example, by evaluating browsing history and web activity (e.g., articles, web sites visited, image data viewed, etc), a user's intent can be determined to be to purchase a cellular device and a carrying case for the cellular device.

At reference numeral 706, at least one of a packaged offer including two or more items or a complimentary item can be communicated based on intent. The packaged offer can include two or more items (e.g., goods, services, products, etc.) related to the ascertained intent. Following the above example, the intent can be to purchase a cellular device and a carrying case, wherein the packaged offer can be special pricing from a specific vendor for the combined purchase of a carrying case for the cellular device and the cellular device. Moreover, the intent can allude to a complimentary item (e.g., good, service, product, etc.) that supplements the inferred intent. Following the discussed example, the complimentary item can be cellular service from a provider, a car charger, a battery, and/or any other suitable good or service that compliments and relates to the inferred intent-here, the purchase of a cellular device and a carrying case.

At reference numeral 708, a forum can be utilized for communication between two or more users having a common intent. In particular, the forum can provide email, instant messaging, web postings, real time communications, chat services, video, audio, profiles, and the like. Generally, the forum can allow users having common or substantially similar intent to communicate and interact. For instance, following the above example, a first user and a second user having intentions to purchase a cellular device and a carrying case can initiate communications in order to share information related to such intent.

FIG. 8 illustrates a method 800 for aggregating a plurality of users with substantially similar interests into a forum for data exchange. At reference numeral 802, collections of data can be evaluated in order to infer intent. For instance, the collections of data can be browsing history, viewed documents, executing applications, data related to applications (e.g., email, communications, etc.), purchases, web history, bookmark data, data interacted, viewed data, explicit data identified by a user, web activity, online subscriptions (e.g., RSS feeds, newsletters, forums, etc.), and/or any other suitable data connected to a user that can allude intentions of such user.

At reference numeral 804, a packaged offer for a combination of items related to the intent or an item related to the intent can be identified. In other words, based on the evaluated collections of data, the inferred intent can correspond or correlate to a combination of items (e.g., goods, services, products, etc.), wherein such combination of items can be packaged in a manner to provide a special pricing, offer, deal, etc. Furthermore, an item related to the intent can be identified, wherein such item can be complimentary in that identification of such item satisfies an unfulfilled aspect of the user's intent.

At reference numeral 806, a subscription can be provided to a group for at least one of buying power or packaged discount. For instance, a user can subscribe to a group in order to receive packaged discounts, sales, specific ads, offers, etc. In another example, the subscription can be to a group in which a similar interest exists with a particular good or service, and such group can provide leverage in buying power (e.g., the group increases the amount of sales to lower the per-unit cost). At reference numeral 808, private information for a group member can be protected to ensure anonymity. For example, the anonymity of a user can be protected and ensured when joining or utilizing such groups. Thus, private information or data can be secure, wherein such private information or data can be, but is not limited to, credit card information, account information, user name, passwords, personal information (e.g., address, name, date of birth, phone number, social security number, income, email address, zip code, work affiliations, etc.), age, height, weight, personal tasks, etc.

Figure 9:
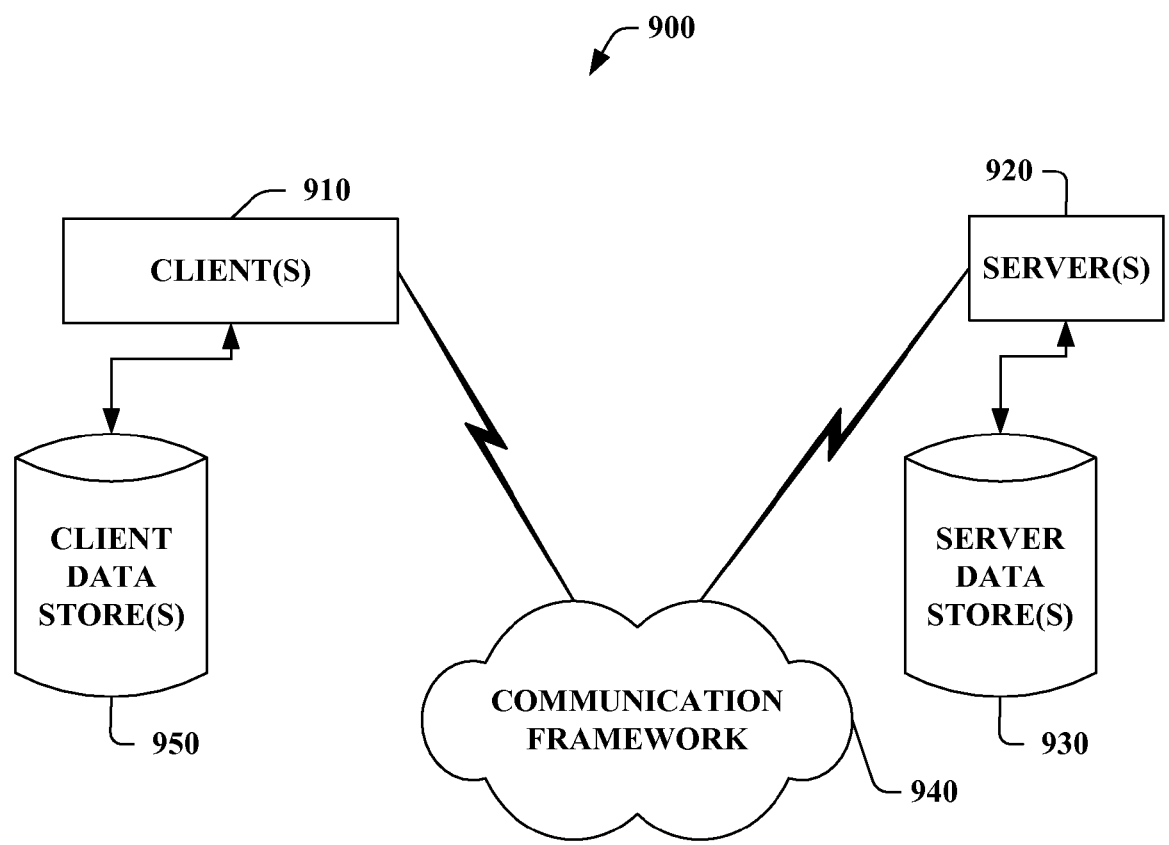
FIG. 9 illustrates an exemplary networking environment, wherein the novel aspects of the claimed subject matter can be employed.
Figure 10:
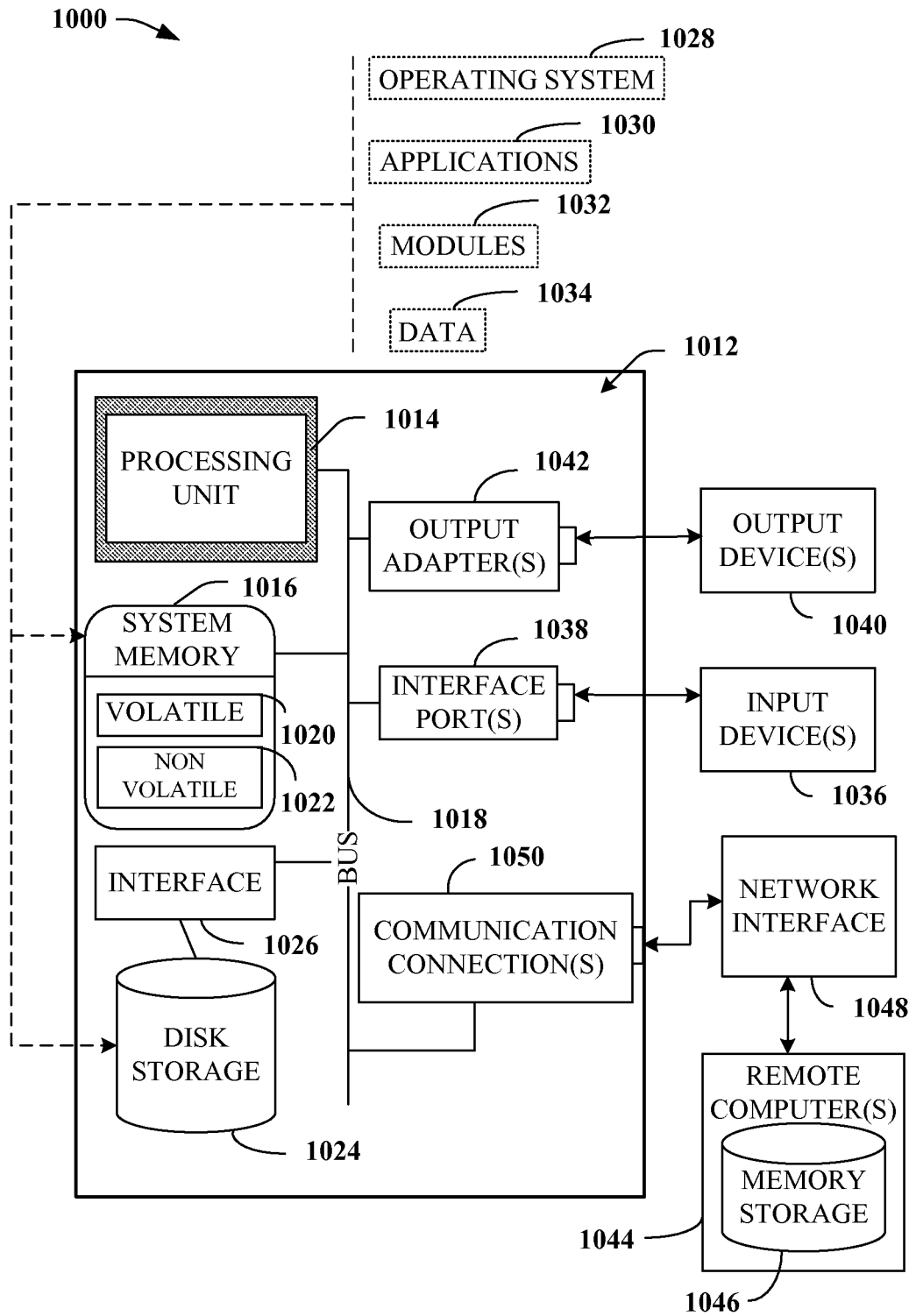
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, an intent component that can identify a user's intent to identify packaged offers or complimentary items, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computer-implemented system comprising:
a processor coupled to a memory;
a display engine maintained in the memory and executed on the processor to:
access a first portion of a multiscale image of a web page during a browsing session, the first portion of the multiscale image being related to a first plane of view of the multiscale image that is associated with a first level of zoom, and
access a second portion of the multiscale image of the web page during the browsing session, the second portion of the multiscale image being related to a second plane of view of the multiscale image that is associated with a second level of zoom different from the first level of zoom;
an intent component, maintained in the memory and executed on the processor, that analyzes data related to the first portion of the multiscale image of the web page associated with the first level of zoom and the second portion of the multiscale image of the web page associated with the second level of zoom obtained during the browsing session to ascertain a combined intent of a user; and
a selective ad component that infers an incompleteness of the combined intent to trigger a pre-qualification for an offer related to at least one of an item or service that fulfills the incompleteness.

2. The system of claim 1, wherein:
the first plane of view and the second plane of view are included in multiple planes of view of the multi-scale image with each plane of view of the multiple planes of view being related to a successive plane of view by a pyramidal volume; and
the multiscale image includes a pixel at a vertex of the pyramidal volume in the first plane of view and multiple pixels at a base of the pyramidal volume in a next successive plane of view at a next level of zoom.

3. The system of claim 2, wherein:
the intent component identifies the combined intent related to the browsing session based on at least two or more of the planes of view navigated during the browsing session, and
the selective ad component incorporates and displays an offer related to the identified combined intent into the browsing session.

4. The system of claim 3, wherein the next successive plane of view displays a particular portion of the multiscale image that is graphically or visually unrelated to the first plane of view.

5. The system of claim 3, wherein the second portion of the multiscale image includes a zoomed in view of the first portion of the multiscale image.

6. The system of claim 1, further comprising a forum, wherein the system aggregates the user with at least one other user into the forum to enable communication between two or more users with a substantially similar combined intent identified from respective data within browsing sessions.

7. The system of claim 1, further comprising a content aggregator to create a 3-dimensional (3D) virtual environment from 2-dimensional (2D) content that is navigated by the user, and
    each portion of the 2D content includes a perspective of an additional multiscale image and a portion of the additional multiscale image which is aggregated to create the 3D virtual environment.

8. The system of claim 7, wherein:
    the intent component identifies an additional combined intent related to a browsing session of the 3D virtual environment, and
    the selective ad component incorporates and displays an offer related to the identified additional combined intent into the 3D virtual environment.

9. The system of claim 1, wherein the intent component further identifies the combined intent within the browsing session by examining at least one of an application executing in connection with the browsing session, a user behavior within the browsing session, a portion of profile data, the browsing history related to a browsing session, usage of the browsing session, a portion of implicit user data, a portion of explicit user data, or data related to a user preference.

10. The system of claim 1, wherein the intent component further identifies the combined intent within the browsing session by examining at least one of an application version data, a type of application, a portion of data utilized by the application, a portion of metadata related to the application, a frequency of use of the application, a portion of copyright data for the application, a manufacturer of the application, a size of the application, a click frequency within the browsing session, a scroll frequency within the browsing session, a portion of highlighting within the browsing session, an input received during the browsing session, an input device location, a duration of browsing on a particular portion of data, an explicit tagging within the browsing session, a frequency of browsing a portion of data, a data feed subscription, or data related to a user setting for a personalized web site.

11. The system of claim 1, further comprising an advertiser that manages at least one offer that is available to the user based on the combined intent.

12. The system of claim 1, wherein:
    the selective ad component provides a packaged offer based on the combined intent, and
    the packaged offer, from a vendor, includes a combination of at least two or more of items, goods, or services.

13. The system of claim 1, further comprising a group solicitor that communicates at least one of an ad, a particular offer, a discount, or a sale related to at least one of a good or a particular service based upon an accepted subscription to a group, wherein the subscription is generated in connection with the combined intent related to the browsing session.

14. The system of claim 1, further comprising a consumer power component that enables a collection of consumers with a common intent to be aggregated in order to provide an increase in buying power, wherein such buying power can justify a discount or price reduction.

15. The system of claim 1, further comprising a privatizer that ensures anonymity by protecting data related to the user that is utilizing the browsing session, wherein the data relates to at least one of a portion of credit card information, a portion of account information, a user name, a password, a portion of personal information, an address, a name, a date of birth, a phone number, a social security number, an income, an email address, a zip code, a work affiliation, an age, a height, a weight, or a personal task associated with a digital calendar.

16. The system of claim 15, wherein the protected data relates to at least one of the following:
    a group solicitor that communicates at least one of an ad, a particular offer, a discount, or a sale related to at least one of a good or a particular service based upon a subscription to a group, wherein the subscription is generated in connection with a portion of browsed data within the browsing session; or
    a consumer power component that enables a collection of consumers with a common intent in at least one of a good or a particular service to be aggregated in order to provide an increase in buying power, wherein such buying power can justify a discount or price reduction.

17. A computer-implemented method comprising:
    collecting a plurality of two dimensional (2D) content;
    creating a three dimensional (3D) virtual environment using the plurality of 2D content
    monitoring user activity related to at least one browsing session of the 3D virtual environment;
    ascertaining, by a processor, intent of the user based on the monitored user activity by analyzing portions of the 3D virtual environment explored during the at least one browsing session, the 3D virtual environment having successively viewable parallel planes including a first plane of view associated with a first level of zoom and a second plane of view associated with second level of zoom; and
    communicating at least one of:
        a packaged offer including two or more items based on the intent; or
        a complimentary item based on the intent.

18. The method of claim 17, further comprising:
    aggregating the user along with at least one other user into a forum to enable communication between two or more users ascertained to have a common intent;
    providing a subscription to a group for at least one of a buying power or a packaged discount; and
    protecting private information for a group member to ensure anonymity.

19. The method of claim 17, wherein the first plane of view is related to the second plane of view by
    a pyramidal volume of space between the first plane of view and the second plane of view; and
    presenting the packaged offer or the complimentary item to the at least one browsing session based on the intent.

20. A computer-implemented method comprising:
    under control of one or more processors configured with executable instructions,
        providing an initial view of a first portion of a web page during a browsing session, the first portion of the web page representing a computer displayable multiscale image with at least two substantially parallel planes of view in which a first plane of view and a second plane of view are alternatively displayable based upon a level of zoom and which are related by a pyramidal volume;
        providing an additional view of the webpage by panning to a second portion of the webpage during the browsing session, wherein at least a portion of the second portion of the web page is different from the first portion of the web page;

receiving data related to the browsing session, the data comprising a browsing history, the first portion of the web page explored during the browsing session, and the second portion of the web page explored during the browsing session;

evaluating the browsing history, the first portion of the web page explored during the browsing session, and the second portion of the web page explored during the browsing session to ascertain a combined intent of a user;

identifying an incompleteness of the combined intent to trigger a pre-qualification for an offer related to at least one of an item or service that fulfills the incompleteness;

communicating the offer or item to a user; and aggregating the user with at least one other user into a forum for establishing communications between two or more users sharing a similarity in respective combined intents.

* * * * *